United States Patent [19]
Murakami

[11] Patent Number: 5,169,092
[45] Date of Patent: Dec. 8, 1992

[54] PARAGLIDER CANOPY

[76] Inventor: Kenji Murakami, 26 Yamasaki-chyo, Shiso-gun Hyogo Prefecture, Japan, 671-25

[21] Appl. No.: 744,327

[22] Filed: Aug. 13, 1991

[51] Int. Cl.⁵ .............................................. B64D 17/02
[52] U.S. Cl. ..................................... 244/145; 244/146
[58] Field of Search ............ 244/142, 145, 146, 153 R, 244/16, 900, 142, 145, 146, 153 R, 16

[56] References Cited

U.S. PATENT DOCUMENTS

| Re. 31,205 | 4/1983 | Jalbert | 244/145 |
| 3,131,894 | 5/1963 | Jalbert | 244/145 |
| 3,893,641 | 7/1975 | Sutton | 244/142 |
| 4,406,433 | 9/1983 | Radkey et al. | 244/146 |
| 4,768,739 | 9/1988 | Schnee | 244/146 |
| 4,771,970 | 9/1988 | Sutton | 244/146 |
| 4,846,424 | 7/1989 | Prouty | 244/145 |

Primary Examiner—Joseph F. Peters, Jr.
Assistant Examiner—Virna Lissi Ansley
Attorney, Agent, or Firm—George M. Cole

[57] ABSTRACT

Airfoil canopy for paragliders made of non-porous cloth and comprised of a number of parallel primary air chambers (12) having upper surfaces (14), lower surfaces (16), open front ends (18), tail ends (20) and ribs (22). Secondary chambers (30) are provided within each primary chamber together with an opening (36) to the secondary chamber and a flap or curtain member (40) for blocking the back flow of air out of the secondary chamber in the event of air pressure loss in the primary chamber.

3 Claims, 2 Drawing Sheets

PARAGLIDER CANOPY

TECHNICAL FIELD

The invention relates to the field of paragliders and more particularly to an improved paraglider canopy or airfoil body construction to reduce and prevent instances of canopy collapse during flight.

BACKGROUND OF THE INVENTION

The invention relates to a paraglider which flies by the lift force of a collapsible airfoil. As those skilled in the art are aware a paraglider airfoil is formed and maintained in its inflated stated by air entering as the paraglider moves forwardly in flight.

The canopy of a conventional paraglider is made of a non-porous cloth material and is divided into a number of separate, parallel air chambers by vertical ribs. The front is generally is open to form an air intake opening. Air enters each chamber through the front air intake opening and inflates the canopy. In cross section the canopy resembles an airplane wing to provide an airfoil configuration. The paraglider canopy is maintained in its inflated state by its forward flight movement inducing air pressure inside the chambers.

Like an airplane wing, air flowing over both surfaces of the airfoil exerts an upward force or lift and thus the device can glide through air. Paragliders of the type described are well known and in use.

So long as the glider maintains its forward speed using natural winds and air currents it is well able to fly.

A canopy that is made of non-porous cloth which is both soft and flexible can be folded or compacted into a relatively small bundle or mass. Thus it is convenient to carry and to stow away.

Air entering the front air intake openings inflates the canopy with sufficient pressure to maintain the canopy's shape.

Some currently known gliding paragliders utilize plastic reinforced cloth materials to prevent collapse of the air intake openings since it will be appreciated that it is important to maintain the air intakes fully opened so that the canopy itself retains its shape. Even partial loss of airfoil configuration can result in loss of glide capability.

Construction of a paraglider with reinforcing material, however, involves the possible risk that the airfoil will collapse because of differences in weight and hardness between the plastic materials and the cloth.

Conventional paragliders made without reinforcing material have a disadvantage in that if the canopy airfoil at least partially collapses it loses air pressure within the canopy chambers. Accordingly, if the canopy cannot maintain its shape because of loss of air pressure inside, then the canopy loses its lift capability, particularly in strong turbulence and winds.

Slowing the forward speed of a paraglider makes it difficult to maintain sufficient ram pressure to keep the airfoil inflated. It will be understood then that the canopy inflation is maintained by forward movement. Slowing forward movement may also cause the canopy to deflate and collapse completely.

Once an air intake opening has lost shape so that the air intake opening is smaller and irregular, ram air pressure is so reduced that the canopy actually acts as a brake. In this situation of course the pilot or operator is in danger of falling. In this circumstance and in order to recover flight capability of the canopy airfoil configuration, it is necessary to undertake a risky maneuver. The pilot or operator must initiate a rapid loss of altitude or quick drop to generate pressure to reestablish air worthiness. While the maneuver may create the necessary air pressure for recovery of flight it may also face the pilot with a crash problem.

SUMMARY OF THE INVENTION

The paraglider canopy of this invention is comprised of a non-porous cloth construction which includes, besides the main or primary air chambers, a secondary chamber which forms a reinforcing unit for the primary chamber. The secondary chamber is filled with air pressure like the primary chamber as the paraglider flies. It includes a check valve construction at the entrance of the secondary chamber which prevents rapid loss of the air pressure build up within the secondary chamber. Thus even though the primary chamber may partially or totally collapse due to loss of air pressure, the secondary chamber maintains its pressure for a sufficient period of time to assist in holding the canopy's shape and thus allow the primary chamber time to recover its shape.

Accordingly it is among the features and advantages of the invention that the canopy self-reinforcing structure is unique but simple in design. The invention reduces the risks of the inflated canopy losing its airfoil shape in the event of an unexpected loss of air pressure. Air pressure to the primary chambers when the canopy is inflated is also directed into the secondary chambers. Once they are inflated the secondary chambers retain their inflated condition for a measurable period of time because back flow of air out of the secondary chamber is prevented by the check valve.

The invention increases the safety factor of the paraglider because the danger of losing flight capability is reduced. There is no danger when folding the canopy that damage will be done to the canopy material because of harder materials being used with the cloth in the canopy construction.

BEST MODE FOR CARRYING OUT THE INVENTION

Figure 1:
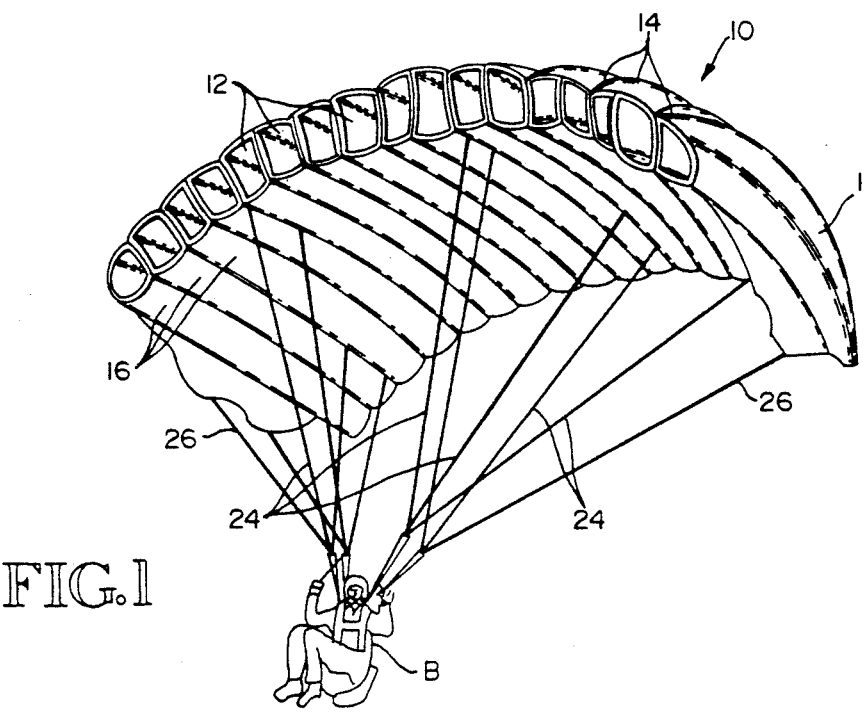
FIG. 1 is a view in perspective showing a typical paraglider in flight.

As those skilled in the art are aware, a paraglider, generally designated by the number 10, is a form of wing or airfoil made of a flexible, non-porous cloth. Thus, it is collapsible so that it can be folded or compacted when not in use into a relatively small bundle. In use it is inflated as shown in FIG. 1. A number of suspension lines 24 are provided which attach to the canopy and extend downwardly to the pilot's harness. Lines 26 at the outer side edges extend down to the pilot's location for controlling the glider's flight.

Figure 2:
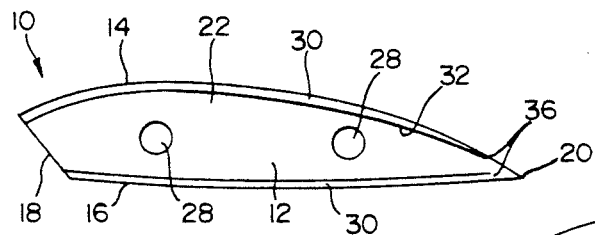
FIG. 2 is a diagrammatic view of a primary air chamber in the canopy with secondary chambers on the upper and lower airfoil surfaces.

The wing or canopy is divided into a plurality of chambers 12 which are open at the front and substantially closed at the rear. In general cross section from front to rear, as shown in FIG. 2, the canopy resembles a typical airfoil or wing. It has upper surface 14, lower surface 16, front end or leading edge 18 and rear end or trailing edge 20.

Chambers 12 are separated by ribs 22 extending from leading to trailing edge of the cross section. Ribs 22 between the chambers 12 are provided with spaced apart holes 28 so that chambers 12 are interconnected to equalize air pressure within the canopy and to maintain inflation of the canopy. The device so far described is basic paraglider construction. However, reference is made to background discussion above.

Figure 3:
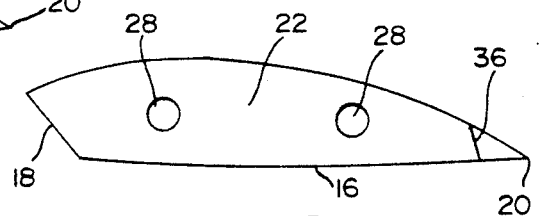
FIGS. 3 and 3a show a secondary chamber in conjunction with the rib surface of a primary chamber.
Figure 3A:
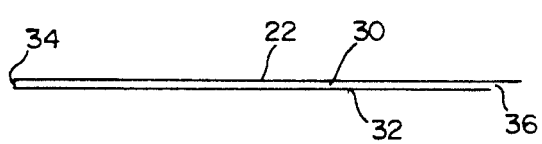
Figure 3B:
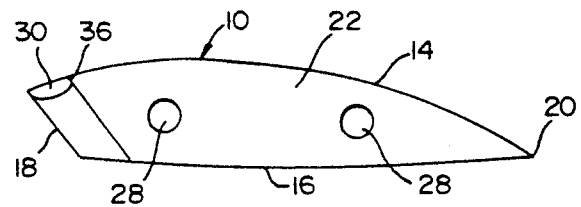
FIG. 3b shows a secondary chamber formed at the forward open end of a primary chamber.
Figure 4:
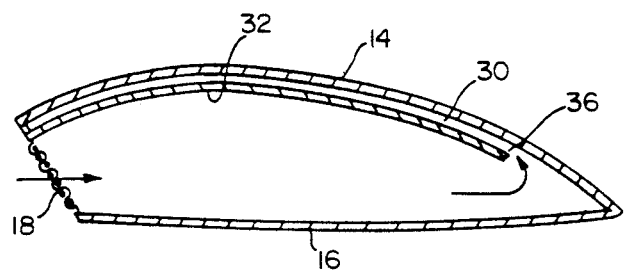
FIG. 4 shows a secondary chamber in conjunction with only the upper airfoil surface of a primary chamber.
Figure 5:
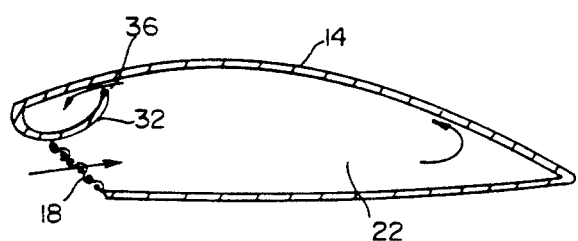
FIG. 5 shows a secondary chamber extending across the upper horizontal edge of the forward end of a primary chamber.
Figure 6:
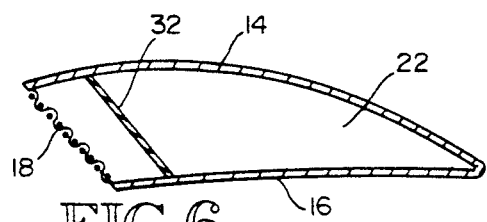
FIGS. 6 and 7 show a secondary chamber formed along the forward vertical edge of a primary chamber similar to FIG. 3b.
Figure 7:
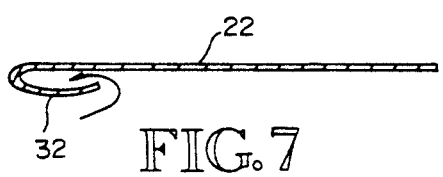

The invention resides in providing secondary reinforcing chambers within and in combination with the primary chambers 12. Thus, in FIGS. 3, and 3a, for example, a secondary chamber 30 is formed in conjunction with rib 22 by adding a second partition member 32 spaced a predetermined distance from main rib 22. The secondary chamber 30 defined by the partition 32 and rib 22 is closed at the front end as at 34 and at the top and bottom, but is open at the rear as indicated by the number 36. The partition 32 is preferably made of the same material as the canopy itself. FIG. 2 shows secondary chambers 30 along the inside of the top and bottom airfoil surfaces 14 and 16 while the embodiment of FIG. 3b shows a vertical reinforcing secondary chamber 30 formed along the front opening 18 in conjunction with the front edge of a rib 22.

Figure 8:
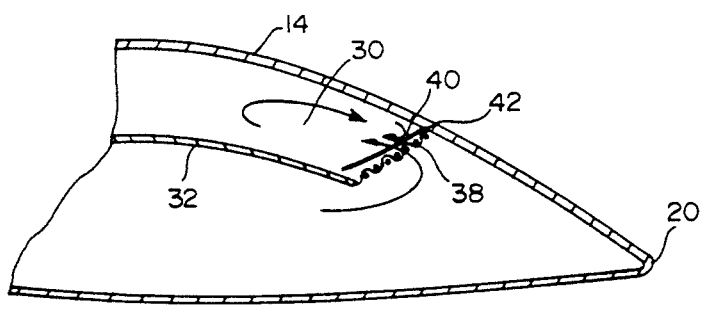
FIG. 8 shows further details of the check valve structure to prevent back flow of air.
Figure 9:
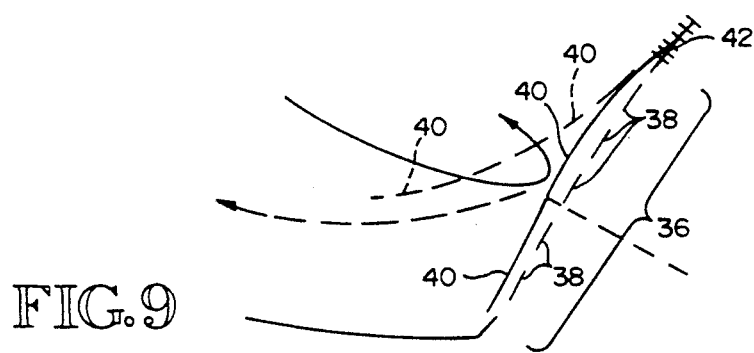
FIG. 9 shows additional details of the structure of a check valve for the secondary chambers.

FIGS. 8 and 9 illustrate one structure for preventing back flow of air out of a secondary chamber in the event there is a loss of air pressure in its primary chamber 12. The secondary chamber, again formed by a vertical or horizontal wall of the primary chamber and a secondary wall or partition 32, is open as at 36 at only one location as described for instance with respect to FIG. 2. Opening 36 may be covered by a porous mesh material 38 which allows air under pressure to flow from primary chamber 12 into secondary chamber 30. A flap 40 which is hinged along one edge as at 42 in FIGS. 8 and 9 normally allows passage of the air on into the secondary chamber. However, in the event of a sudden drop or decline in air pressure in the primary chamber, the pressure differential will force the flap to close over the opening against the mesh 38 and block the air pressure in the secondary chamber from dropping quickly. Thus, the secondary chamber remains inflated and uncollapsed and lends a reinforcing or rigidizing element to the canopy structure. It will be appreciated that a prolonged drop of pressure in the primary chamber will allow the air in the secondary chamber to bleed off, but what is prevented is a sudden loss of air from the secondary chamber. Accordingly it can be seen that the flap 40 acts as a check valve against sudden loss of air pressure in the secondary chambers.

FIGS. 4, 5, 6 and 7 show that secondary chambers may be provided on the top airfoil surface only if desired, on the vertical forward edge of the air intake opening of the canopy chamber or on the horizontal forward edge of the air intake opening. The flexibility of the design enables the manufacturer of the paraglider canopy to place the secondary chamber within the main chamber where it is felt it will best serve its intended function. Clearly, other types of air check valve structures may be used, but the type shown is simple, inexpensive and effective.

I claim:

1. A flexible airfoil wing canopy for paragliders, comprising:
    a) an elongated body made of flexible, non-porous cloth material formed into a plurality of side-by-side primary chambers to define a wing having top and bottom surfaces, a front edge and a trailing edge and having end primary chambers, said plurality of primary chambers defining a body of predetermined greater dimension from end-to-end than from front to trailing edge, the front edge of each primary chamber being open to form an air intake opening for the admission of ram air pressure and said primary chambers also being formed to define an airfoil configuration, each of said primary chambers being separated from a primary chamber next to it by a rib member, and
    b) a secondary chamber disposed in each primary chamber wherein a secondary partition is located adjacent to and spaced from a preselected surface within said primary chamber, said secondary partition being attached within said primary chamber so as to define a discrete separate secondary chamber, said secondary chamber being provided with air admission opening means at a point remote from said air intake means to admit ram air pressure into said secondary chamber and also including air restriction means coactively associated with said air admission opening means to prevent the back flow of ram air pressure out of said secondary chamber in the event of a loss of ram air pressure within said primary chamber.

2. The flexible airfoil canopy wing according to claim 1 and wherein said air restriction means is a flap means to block said air admission opening means in the event air attempts to flow back out of said secondary chamber.

3. The flexible airfoil canopy wing according to claim 1 and wherein said air admission opening means is covered with porous mesh material and said air restriction means is located within said secondary chamber.

* * * * *